United States Patent
Davis et al.

[11] Patent Number: 5,882,034
[45] Date of Patent: Mar. 16, 1999

[54] AUTOMOBILE AIRBAG SYSTEM

[75] Inventors: Benjamin Rodney Davis, Chandler, Ariz.; Kim Roger Gauen, Noblesville, Ind.

[73] Assignee: Motorola, Inc., Schaumburg, Ill.

[21] Appl. No.: 641,868

[22] Filed: May 2, 1996

[51] Int. Cl.$^6$ ................................................ B60R 21/32
[52] U.S. Cl. ........................................................ 280/735
[58] Field of Search ................................. 280/734, 735

[56]                References Cited

U.S. PATENT DOCUMENTS

| | | | |
|---|---|---|---|
| 4,819,560 | 4/1989 | Patz et al. | 102/202.5 |
| 5,083,276 | 1/1992 | Okano et al. | 364/424.05 |
| 5,122,780 | 6/1992 | Midorikawa et al. | 340/438 |
| 5,202,831 | 4/1993 | Blackburn et al. | 280/735 |
| 5,261,694 | 11/1993 | White et al. | 280/735 |
| 5,411,289 | 5/1995 | Smith et al. | 280/735 |
| 5,432,385 | 7/1995 | Kincaid et al. | 307/10.1 |
| 5,454,591 | 10/1995 | Mazur et al. | 280/735 |
| 5,482,314 | 1/1996 | Corrado et al. | 280/735 |
| 5,504,379 | 4/1996 | Mazur et al. | 280/735 |

FOREIGN PATENT DOCUMENTS

| | | |
|---|---|---|
| 0471871 | 2/1992 | European Pat. Off. . |
| 9012215 | 10/1990 | Germany . |
| 4300342 | 7/1994 | Germany . |
| 4404816 | 8/1995 | Germany . |

OTHER PUBLICATIONS

"Electronic Crash Sensors For Restraint Systems", Bergfried et al., Vehicle Electronics in the 90's, Society of Automotive Engineers, Inc., Warrandale, PA, Oct. 1990, pp. 169–177.

"Semiconductor Igniter Makes Multiple Air Bags Likelier", NTIS Tech Notes, Nov. 1, 1991, p. 884.

Primary Examiner—Kenneth R. Rice
Attorney, Agent, or Firm—Sharon K. Coleman; Gary W. Hoshizaki

[57]           ABSTRACT

An automobile airbag system for protecting human occupants of an automobile during an accident is provided. An airbag assembly comprises an airbag inflator assembly (45), an airbag (40), and a remote module (41). The remote module (41) includes a capacitor (42) and an integrated circuit (43) for coupling current through a squib (44) to ignite pyrotechnic material (46). The remote module (41) is formed as a plug which connects to the airbag (45) to simplify manufacture. Capacitor (42) provides energy to the squib (44) and switches for forming a conductive path that couples the current through the squib (44). The wiring between the integrated circuit (43) and the squib (44) is less than 3.0 centimeters to reduce electromagnetic radiation pick up.

25 Claims, 3 Drawing Sheets

AUTOMOBILE AIRBAG SYSTEM

BACKGROUND OF THE INVENTION

This invention relates, in general, to airbag systems, and more particularly, to an integrated system architecture for automobile airbags.

Airbags in conjunction with seat belts have proven to be a primary safety mechanism in preventing severe automobile accident injuries. An airbag is a safety device that cushions impact when an automobile collision occurs. Sensors detect when an impact is going to occur via proximity sensors or by the occurrence of the actual impact deceleration itself. Once an accident situation is detected, an airbag is rapidly inflated providing a cushion to soften the blow instead of hitting a hard surface.

In general, airbags are placed in locations or surfaces of an automobile causing occupant injuries. For example, head impact is prevented by placing airbags in the steering wheel or dash board of an automobile. Airbags are also placed in doors for occupant protection in side impacts and under the dash to prevent leg injuries.

The duration of a crash is typically measured in milliseconds. The accident must be sensed and the airbag deployed within a few milliseconds after impact. Circuitry couples energy to a squib which is in contact with igniter pyrotechnic material. The ignitor pyrotechnic material resides near the airbag inflator pyrotechnic material. The energy coupled to the squib produces heat igniting the ignitor pyrotechnic material which in turn ignites the airbag inflator pyrotechnic material. The burning inflator pyrotechnic material produces hot gases which expand into the airbag to inflate the airbag. The inflated bag cushions a person being propelled into the airbag during a collision.

It would be of great benefit if an airbag system architecture could be provided that significantly reduces costs while providing increased performance and control of airbag detonation.

DETAILED DESCRIPTION OF THE DRAWINGS

Figure 1:
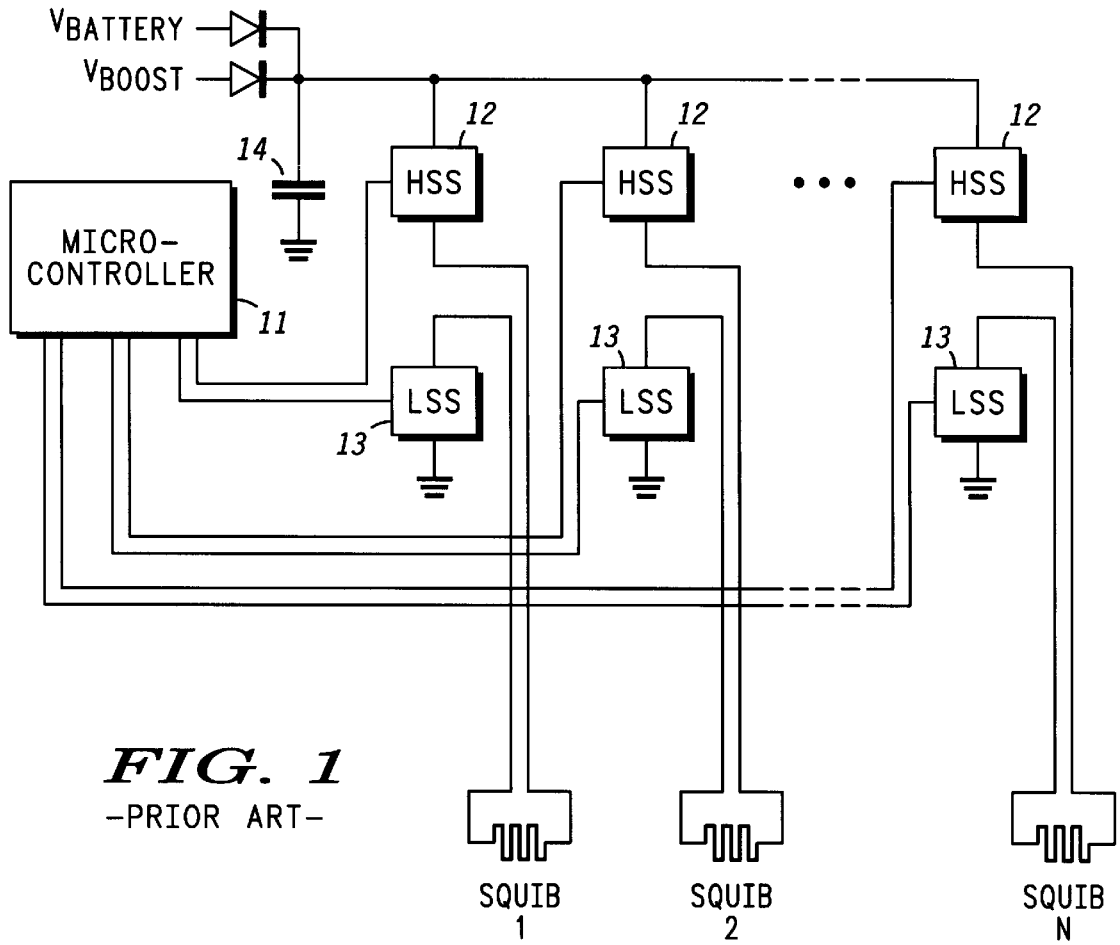
FIG. 1 is a prior art block diagram of a system for controlling multiple airbags.

FIG. 1 is a prior art block diagram of a system for controlling multiple airbags. The block diagram illustrates the basic principles of operation for enabling an airbag. An airbag is inflated by detonating or igniting a charge of pyrotechnic material in the airbag inflator. The inflator pyrotechnic material is ignited by an ignitor having a squib element in contract with a small charge of pyrotechnic material. The squib is typically a wire or some other resistive material capable of generating heat when conducting a current.

In an accident situation, a squib is enabled to conduct current, the current generates heat in the squib igniting the ignitor pyrotechnic material. The ignited ignitor pyrotechnic material produces hot gases which ignite through a chamber the inflator pyrotechnic material. The burning inflator pyrotechnic material generates hot gases which are released into a deflated airbag causing the airbag to rapidly inflate. The inflated airbag cushions the impact when a human being is subjected to the rapid deceleration of an accident.

A microcontroller 11 enables, monitors, and tests the circuitry associated with an airbag. In general, high side switches (HSS) 12 and low side switches (LSS) 13 are used to control energy coupled from the power supply to the squib. Both HSS 12 and LSS 13 must be enabled simultaneously to form a conductive path through a squib. The use of two switches to form a completed circuit path through a squib provides a degree of fail-safing the mechanism against inadvertent enabling of an airbag. The use of HSS and LSS allows independent operational tests to be conducted on switches without causing detonation. Single switch airbag systems are also being offered by automobile manufacturers with good results. Microcontroller 11 provides control signals for enabling HSS 12 and LSS 13. As shown in FIG. 1 each squib has a corresponding pair of switches individually controlled by microcontroller 11.

In general, micro-controller 11, high side switches 12, low side switches 13, and a capacitor 14 are placed in a common electronic control module of an automobile for example, inside the dash area of a vehicle. The squibs and inflator associated with an airbag are remotely located from the control module (capacitor 14, HSS 12 and LSS 13). In the event of a collision, battery energy may be discontinued. Capacitor 14 provides a reservoir of energy for the airbag system to remain operational for a brief period following a crash to insure deployment of all necessary airbags. For example, an airbag is commonly located in the steering wheel, dash board, door panels, or any other location where human contact is possible during a collision. A problem associated with centrally locating the power source capacitor 14, HSS 12, and LSS 13 away from the squibs is that long wire runs are required between the switches and corresponding squib. The wire runs are often one to two meters in length. It is well known that long wire runs are receptive to electromagnetic radiation inducing a current into the wire runs. In fact, automobiles produce a substantial amount of electromagnetic radiation in normal operation or are subjected to electromagnetic radiation in the normal course of driving.

It is a concern in the automotive industry that electromagnetic pickup in the wiring of an airbag system does not deploy an airbag inadvertently. The force at which an airbag inflates can produce injuries. As shown in prior art FIG. 1 and typical to prior art systems, microcontroller 11, capacitor 14, HSS 12, and LSS 13 are located in close proximity to one another. Squibs 1–N are located with the airbags at some distance from HSS 12 and LSS 13. In general, the greater the length of a wire, the more receptive it will be to electromagnetic radiation. Obviously, it is not desired that current induced by stray electromagnetic radiation due to the long wire runs deploy an airbag. To eliminate this prospect from occurring, a high current is required to produce sufficient heat in a squib to ignite the pyrotechnic material. The high current is chosen to eliminate the possibility of electromagnetic pick up generating a similar current level. Typically, the high current is in excess of one ampere. Electromagnetic radiation pick up with two meter length wires as described hereinabove will not produce anywhere near a one ampere current. HSS 12 and LSS 13 must be designed to handle the high current levels dictated by the prior art airbag system. A squib resistance is typically on the order of two ohm for a prior art airbag system.

In accident situations it cannot be assumed that the battery remains active. As shown in FIG. 1 a single power supply source (capacitor 14) provides power to each squib of the airbag system. A problem with using a single supply source (capacitor 14) is one squib may hog all or most of the current thereby preventing other squibs from being deployed. Current limit circuitry (not shown) is added in each squib conductive path to prevent any one squib from using more current than required to ignite a corresponding airbag. The current limit circuitry is added at an increased cost and complexity of the system. The current limit circuitry causes system energy to be lost in the form of heat in the current limit circuitry and a reduction in voltage imposed on the squib. The lost heat energy in HSS 12 or LSS 13 as a result of current limiting represents a significant system energy inefficiency. The voltage reduction due to the current limit circuitry is compensated for by increasing the voltage stored on the capacitor. In general, the voltage stored on capacitor 14 is significantly greater than the battery voltage of an automobile. Capacitor 14 has a high capacitive value and a high voltage rating so as to be able to provide adequate energy necessary to heat the squib to a level which ignites the pyrotechnic material.

In general, capacitor 14 must store sufficient energy so as to supply a current sufficient to heat each squib to ignite pyrotechnic material coupled thereto. A typical value for capacitor 14 in a two squib system is 4,700 microfarads (uf). The large value of capacitance limits the type of capacitor that can be cost effectively used to an aluminum electrolytic capacitor. Moreover, a voltage greater than the battery voltage is provided in prior art airbag systems to charge capacitor 14. A voltage boost circuit (not shown) provides a boosted voltage (for example, 40 volts) to a Vboost input which couples to capacitor 14. The automobile battery voltage is also provided to a Vbattery input (as shown in FIG. 1) to initially charge capacitor 14. A high voltage/high capacitance capacitor is a costly component of an airbag system. Moreover, an aluminum electrolytic capacitor commonly used in prior art airbag systems is a reliability problem. It is well known that electrolytic capacitors dry out with age which can reduce the value of the capacitor or in a worst case short out or become non-functioning thereby rendering the airbag system useless.

Figure 2:
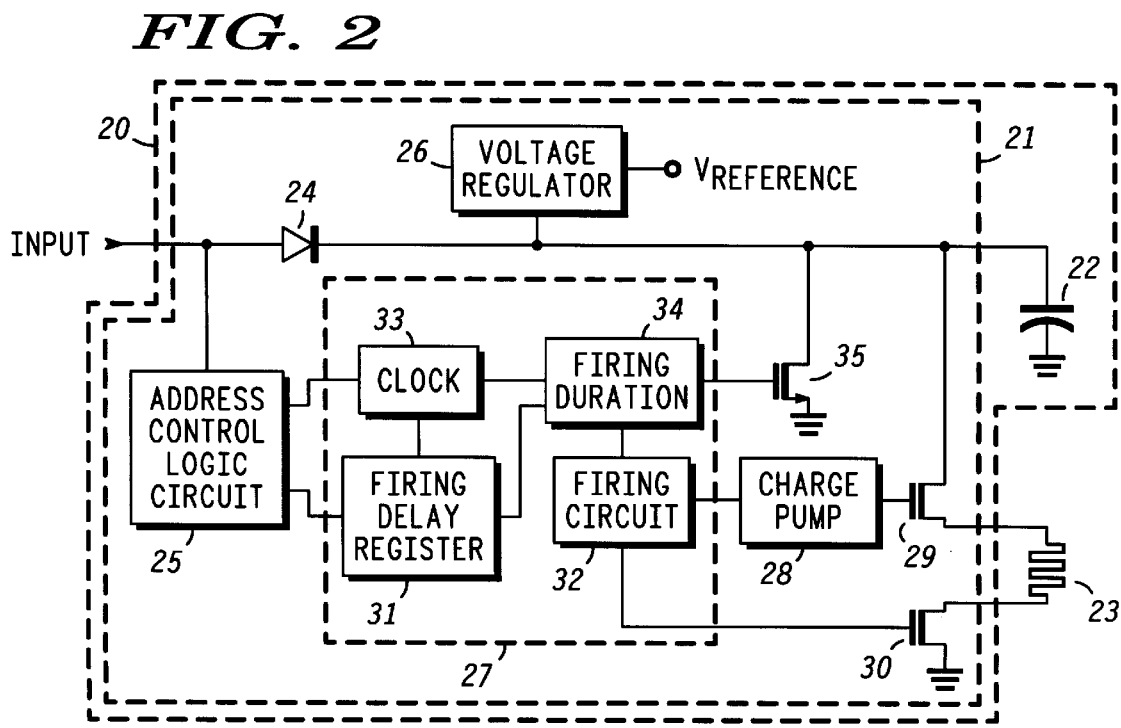
FIG. 2 is a block diagram of a remote module for use in an airbag system in accordance with the present invention.

FIG. 2 is a block diagram of a remote module 20 for use in an airbag system of an automobile. Remote module 20 comprises a capacitor 22 constituting a remote energy reservoir and an integrated circuit 21. Remote module 20 is placed in close proximity to a squib 23 and an airbag (not shown). Wiring between integrated circuit 21 and squib 23 is less than 3.0 centimeters to minimize electromagnetic radiation pick up Typically, wiring is less than one centimeter in length.

Remote module 20 reduces a current magnitude for igniting a pyrotechnic material by locating capacitor 22 (remote energy reservoir) and switches (transistors 29 and 30) near squib 23. This minimizes the conductive path system losses delivering a greater portion of energy to the squib. Capacitor 22 is included in remote module 20 to provide energy for powering circuitry in remote module 20 and powering squib 23 in an accident situation. Transistor 29 and 30 are switches that form a high conductivity path from capacitor 22 to squib 23 and from squib 23 to ground when enabled. Squib 23 heats up when conducting a current that ignites the airbag's pyrotechnic material in the airbag.

Integrated circuit 21 has a dual purpose input terminal for the purpose of receiving control signals, and supply energy; a first output connected to a first terminal of squib 23, and a second output connected to a second terminal of squib 23. Capacitor 22 has a first terminal connected to the supply terminal of integrated circuit 21 and a ground return (or ground reference) terminal (e.g. ground). Integrated circuit 21 comprises a diode 24, an address control logic circuit 25, a voltage regulator 26, a programmable firing delay circuit 27, a charge pump 28, a transistor 29, and a transistor 30.

In an embodiment of integrated circuit 21, diode 24 has an anode connected to the input of integrated circuit 21 and a cathode connected to the remote energy reservoir (capacitor 22) terminal of integrated circuit 21. A control signal applied to the input of integrated circuit 21 is a dual purpose signal. First, the control signal charges up capacitor 22 for powering circuitry of integrated circuit 21. Second, the control signal controls operation of the circuitry, for example, diagnostics or deploying an airbag. The control signal also continuously charges capacitor 22 as power is dissipated by integrated circuit 21. Diode 24 is forward biased for conducting charge to capacitor 22 when the control signal voltage is greater than the capacitor voltage. Capacitor 22 is isolated from the input of integrated circuit 21 by diode 24 when the control signal voltage is less than the voltage on capacitor 22.

Voltage regulator 26 provides a reference voltage. Voltage regulator 26 has an input connected to the remote energy reservoir terminal of integrated circuit 21 and an output for providing integrated circuit 21 the referenced bias voltage. Voltage regulator 26 provides a stable power supply voltage to address control logic circuit 25, programmable firing delay circuit 27, and charge pump circuit 28, while the voltage on capacitor 22 fluctuates.

Address control logic circuit 25 receives and processes a control signal applied to the input of integrated circuit 21. Address control logic circuit 25 monitors the control signal for an address corresponding to a specific remote module 20. The address facilitates communication to a remote module 20 to deploy the airbag or perform diagnostics. Further information is also provided after the address is received. For example, in an accident situation, a control module (not shown) provides a delay time after the address has been verified. Address control logic circuit 25 receives the delay time to be programmed after verification of the address and provides the delay time to programmable firing delay circuit 27 which delays deployment of the airbag. After the delay time, transistors 29 (High Side Switch) and 30 (Low Side Switch) form a conductive path through squib 23 between capacitor 22 and ground. Hereinafter, transistors 29 and 30 are respectively called HSS 29 and LSS 30. A current conducted by squib 23 produces heat in squib 23 which ignites a pyrotechnic material that deploys the airbag.

Alternately, when remote module 20 is addressed, specific diagnostics can be performed to test the functionality of each remote module 20 in the system. Address control logic circuit 25 provides information back on the line to the control module indicating status of the circuit. If a fault is detected, the control module provides a warning that service is required. In an accident situation, remote module 20 may be determined by the control module to not be fired if a fault were detected.

Programmable firing delay circuit 27 allows the automobile manufacturer to control when an airbag is deployed. For automobiles with multiple airbags, a sequence of deployment may provide additional safety depending on the type of collision (frontal, rear, or side) and the type of occupants (children/adults) in the vehicle. The timing of deployment is controlled by programmable firing delay circuit 27. Programmable firing delay circuit 27 comprises a firing delay register 31, a firing circuit 32, a clock 33, and a firing duration circuit 34.

Address control logic circuit 25 has a first output connected to an input of clock circuit 33 and a second output. Clock circuit 33 provides a clock signal having a repeatable time period. Clock circuit 31 provides a clock signal to firing delay register 33 and firing duration circuit 34. Firing duration circuit 34 has a first input connected to clock circuit 33, a second input, a first output, and a second output. Firing delay register 31 connects to address control logic circuit 25 for receiving a time delay command. Firing delay register 31 has a first input connected to the second output of address control logic circuit 25, a second input connected to clock circuit 33 and an output connected to the second input of firing duration circuit 34. Firing circuit 32 has an input connected to the first output of firing duration circuit 34, a first output, and a second output. Charge pump 28 has an input connected to the first output of firing circuit 32 and an output. HSS 29 has a drain connected to capacitor 22, a gate connected to the output of charge pump 28, and a source connected to the first output of integrated circuit 21. LSS 30 has a drain connected to the second output of integrated circuit 21, a gate connected to the second output of firing circuit 32, and a source connected to ground. Charge pump 28 boosts the magnitude of the voltage of a control signal provided by firing circuit 32 to fully enable HSS 29 for coupling squib 23 to capacitor 22. A transistor 35 has a drain connected to capacitor 22, a gate connected to the second output of firing duration circuit 34, and a source connected to ground. Transistor 35 is a disarming circuit that discharges capacitor 22 following an airbag deployment and is also used in a power down instruction from the central control module.

Address control logic circuit 25 receives an address corresponding to remote module 20 which starts a firing sequence for deploying an airbag. A delay is also provided which is loaded into firing delay register 31. Address control logic circuit 25 starts the firing sequence by enabling clock circuit 33. Under normal conditions, clock circuit 33 clocks firing delay register 31 for the delay time stored in firing delay register 31. After the delay, firing delay register 31 outputs an enable signal to firing duration circuit 34 to deploy the airbag. Firing duration circuit 34 receives the enable signal and starts a timed sequence for enabling HSS 29 and LSS 30. The enable signal is coupled from firing duration circuit 34 to firing circuit 32. Firing circuit 32 enables both HSS 29 and LSS 30 for forming a conductive path from capacitor 22 through squib 23 to ground. Charge pump 28 coupled between the first output of firing circuit 32 and the gate of HSS 29 boosts the magnitude of the voltage provided by firing circuit 32 to fully enable transistor HSS 29 to minimize a drain to source voltage across the device. The current coupled through squib 23 by transistors HSS 29 and LSS 30 generates heat in squib 23 that ignites pyrotechnic material of the airbag.

Firing duration circuit 34 has a second purpose of limiting the time period in which HSS 29 and LSS 30 are enabled. The timing function is started when the enable signal is received by firing delay register 31. Clock 33 clocks firing duration circuit 34 to generate the time period. Firing duration circuit 34 serves a disarming/safing function. Once a fire command signal has been received and acted upon by integrated circuit 21, squib 23 is expected to have caused ignition of the pyrotechnic material and deployed the airbag. If squib 23 fails to ignite the pyrotechnic material in a timely manner a latent or dormant deployment condition could exist which could become unexpectedly active with energy applied creating a potential hazard to vehicle occupants as well as crash rescue personnel. Squib 23 is typically expected to ignite the pyrotechnic material within approximately 2 milliseconds of applying firing current/energy to squib 23. The duration time of the Firing duration circuit 34 is fixed and designed into integrated circuit 21 to meet squib 23 requirements.

Firing duration circuit 34 allows firing current/energy from capacitor 22 to be delivered to squib 23 for the expected time period necessary to incur ignition of the pyrotechnic material. After the time period, capacitor 22 is discharged to ground by transistor 35 thereby preventing inadvertent airbag deployment due to continued current being applied by capacitor 22 to squib 23.

As mentioned previously, electromagnetic radiation pick up is a problem when long wire lengths are needed to complete a circuit path to deliver current to a squib. Electromagnetic radiation can produce a current in the circuit path through a squib which could detonate an airbag inflator. The problem of an airbag being deployed by electromagnetic radiation pick-up in prior art systems is minimized by requiring a high magnitude current to generate heat in a squib to deploy the airbag. A low resistance squib (typically two ohms or less) is used in the prior art systems. The high magnitude current used in the prior art airbag systems requires a high capacitance/high voltage capacitor and high current/low resistance transistors capable of coupling the current to the squib. The wiring between the transistors and squib must also be capable of handling the substantial current with minimal voltage drop. Each of these requirements increases the cost of the prior art system.

The use of remote module 20 at each airbag in an airbag system removes the constraints required in the prior art system. Remote module 20 is placed in close proximity to squib 23 to minimize electromagnetic radiation pick up and to minimize energy loss due to transmission losses. Remote module 20 includes circuitry for providing and coupling a current to squib 23 (capacitor 22, transistor 29, and transistor 30). Control signals from a control module (not shown) to remote module 20 are not high current signals so the wiring does not have to be as substantial as prior art airbag systems. In particular, remote module 20 is placed with squib 23 and an airbag. Remote module 20, squib 23, and the airbag form an airbag assembly.

Wiring between transistors 29 and 30 and squib 23 is less than 3.0 centimeters. In an embodiment of remote module 20, wiring is typically 1 centimeter or less. The short length of wiring used to connect transistors 29 and 30 to squib 23 substantially reduces electromagnetic radiation pick up thereby decreasing a current that is electromagnetically generated under normal vehicle operating conditions. Minimizing electromagnetic radiation pick up allows a corresponding reduction in the magnitude of current provided to squib 23. For example, a current of 500 milliamperes which is one half the current magnitude used in prior art airbag systems is safely used in a remote module while providing comparable safety from deployment due to electromagnetic radiation pick up. Reducing the magnitude of the current provided to squib 23 allows transistors 29 and 30 to be reduced in size thereby decreasing the die size of integrated circuit 20 and manufacturing costs.

The resistance of squib 23 is changed to generate the heat required to ignite pyrotechnic material with the lower magnitude current. In general, the resistance of squib 23 is increased from approximately two ohms in prior art systems to greater than ten ohms to generate the heat necessary for pyrotechnic ignition to occur. In an embodiment of remote module 20, squib 23 has a 14 ohm resistance which is sufficient to ignite pyrotechnic material with the lower current magnitude (14 ohms×500 milliamperes=7 volts). The higher resistance of squib 23 allows a common integrated circuit material such as doped polysilicon to be used to fabricate squib 23 with a high degree of control. The energy needed to ignite pyrotechnic material is substantially reduced by decreasing the voltage across squib 23 and increasing the resistance of squib 23. For example, a prior art system requires 5.7 millijoules of energy to ignite pyrotechnic material while a remote module approach requires approximately 0.35 millijoules of energy.

Remote module 20 controls deployment of a single airbag (not shown). In prior art systems, a single control module controls deployment of multiple airbags. The capacitor used to power deployment of multiple airbags in prior art systems had a large capacitive value (for example, 4,700 microfarads at 40 volts) to provide the necessary firing energy for a two squib system. The voltage on the capacitor was also increased from an automobile battery voltage via a voltage boost circuit to increase charge storage of the capacitor. Placing capacitor 22 in remote module 20 reduces the loading on the capacitor from several squibs to a single squib. Moreover, the combination of reduced firing energy current and powering a single squib significantly reduces the requirements on the capacitor. A voltage less than a battery voltage (12 volts) of an automobile is sufficient for the airbag system, for example seven volts. Keeping the voltage needed to a voltage equal to or less than the battery voltage on an automobile eliminates the need for a boost circuit used in prior art circuits further reducing the die size and manufacturing costs of integrated circuit 20. Also, the lower current required for ignition of pyrotechnic material, due to minimization of electromagnetic radiation pick up, and the fact that only a single squib is coupled to capacitor 22 allows for a significant reduction in the magnitude of capacitor 22.

In an embodiment of remote module 20, capacitor 22 is a 68 microfarad capacitor rated at 16 volts. This is a significant reduction when compared with the 4,700 microfarad capacitor rated at forty volts used in prior art systems. The smaller capacitance and lower voltage rating used in remote module 20 allows a variety of different capacitor types to be used that are not commonly available for a high magnitude/high voltage capacitor. For example, aluminum solid capacitors with organic semiconductive electrolyte, specialty polymer capacitors with a solid electrolyte, and tantalum capacitors are high quality capacitors available at the smaller value used in remote module 20. The use of the aforementioned high quality capacitors minimizes the problem of capacitor degradation during the life of an automobile which is a concern of automobile manufacturers. A low capacitance/low voltage capacitor is much less expensive than a high capacitance/high voltage capacitor thereby reducing manufacturing costs of an airbag system.

Ignitor pyrotechnic material is placed in contact with squib 23. Integrated circuit 21 is not integrated with squib 23 but placed a short distance from squib 23. The long term effects of placing an integrated circuit in contact with pyrotechnic material is not well known and could be a reliability and safety issue.

Figure 3:
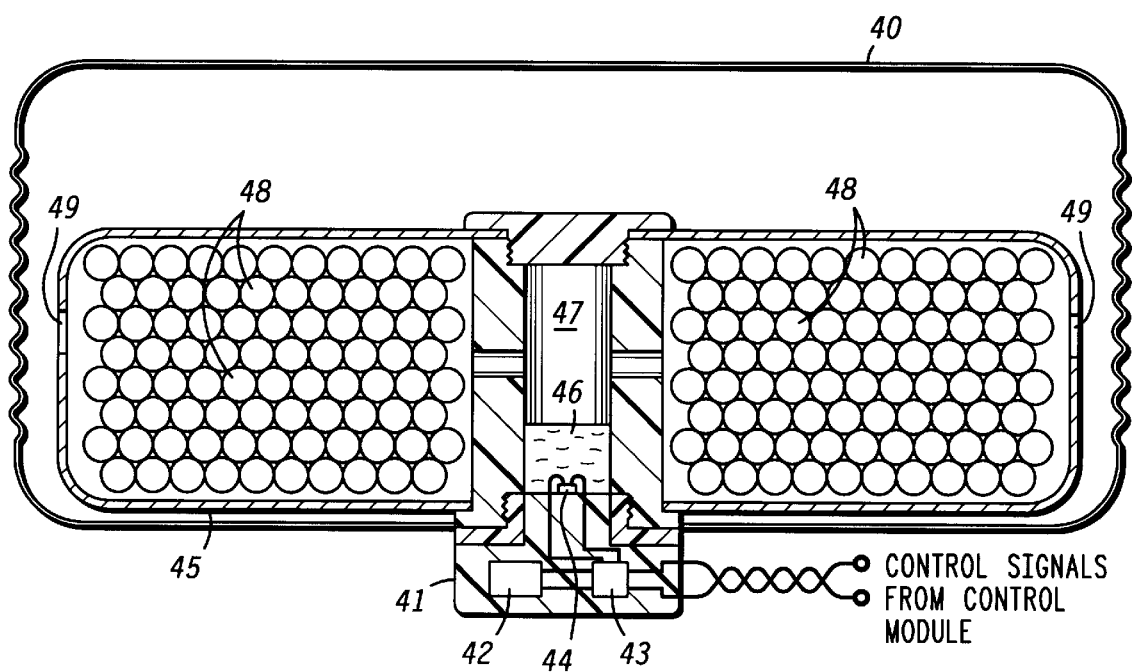
FIG. 3 is a cross-sectional view of an airbag assembly in accordance with the present invention.

FIG. 3 is a cross-sectional view of an airbag assembly for use in an automobile. Airbag assembly includes a remote module 41, an airbag inflator assembly 45, and an airbag 40.

Airbag inflator assembly 45 includes an ignitor pyrotechnic material 46 that contacts a squib 44. Squib 44 generates heat when a conductive path is formed by remote module 41 coupling current from a capacitor 42 through squib 44. The heat generated by squib 44 ignites ignitor pyrotechnic material 46. A chamber 47 couples hot gases released by ignited ignitor pyrotechnic material 46 to areas of airbag inflator assembly 45 filled with inflator pyrotechnic material 48. The hot gases ignite inflator pyrotechnic material 48 which rapidly releases gases through vents 49. Airbag 40 surrounds airbag inflator assembly 45 to receive, inflate, and hold gases released by airbag inflator assembly 45. Airbag 40 has vents (not shown) that release the gases such that airbag 40 is deflated after an impact is cushioned.

As previously mentioned, squib 44 is mounted in airbag inflator assembly 45 to contact pyrotechnic material 46. Leads of squib 44 connect to a male connector of airbag inflator assembly 45. Remote module 41 is formed as a plug having a female connector which corresponds to the male connector of airbag inflator assembly 45. The female plug forms a housing for a capacitor 42 and an integrated circuit 43 which respectively corresponds to capacitor 22 and integrated circuit 21 of FIG. 2. The plug connects to a control module (not shown) which provides control signals for starting deployment of airbag 40 or performing diagnostics. Forming remote module 41 as a plug simplifies connection to airbag inflator assembly 45 and reduces wiring distance between integrated circuit 43 and squib 44 to minimize electromagnetic radiation pick up. The plug itself could also be made of a materiel which would provide shielding to further reduce electromagnetic radiation pick up. Since the squib firing loop is susceptible to electromagnetic radiation pick up; shielding of the loop as well as reducing its' length reduces the susceptibility of inadvertent detonation. In an embodiment, the plug limits wiring distance from the squib 46 to integrated circuit 43 to less than one centimeter.

Figure 4:
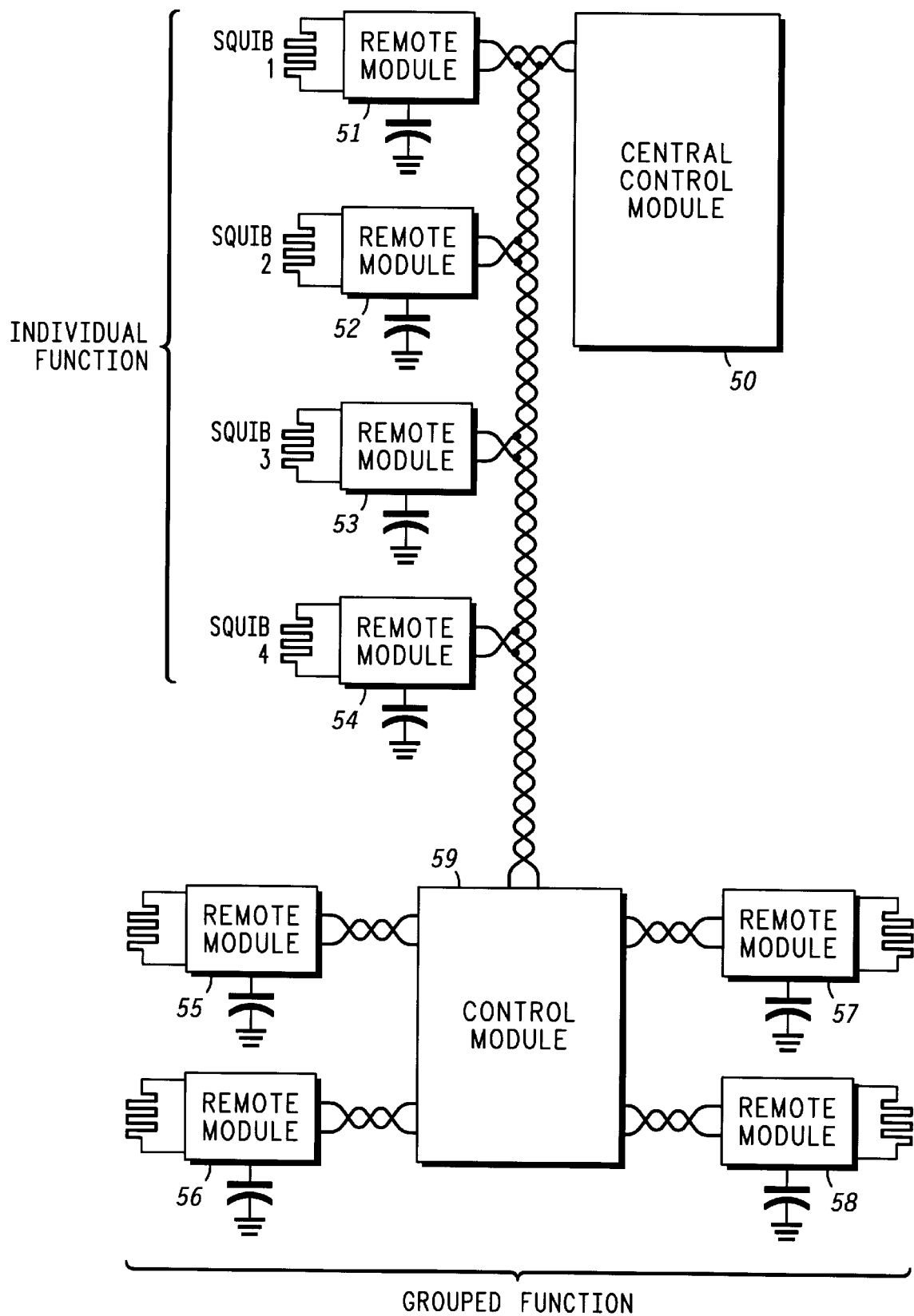
FIG. 4 is a block diagram of a control module connected to remote modules in accordance with the present invention.

FIG. 4 is a block diagram of a central control module 50 connected to a number of remote modules. Control module 40 provides control signals to each remote module. In general, central control module 50 includes a microprocessor (not shown) and sensor circuitry (not shown) for determining when an accident occurs. Each remote module includes circuitry for powering a squib to ignite pyrotechnic material in an airbag as described hereinabove. Remote modules 51, 52, 53, and 54 are labeled as an individual function, as each receives its own control signals from central control module 50. For example, remote module 51 corresponds to a steering wheel airbag while remote module 52 corresponds to a door airbag. The remote modules 51–54 are coupled via a single wire pair since each responds only when a corresponding address is received. Addressing of remote modules 51–54 allows individual deployment at predetermined times. For example, in a frontal collision the steering wheel airbag is deployed but it may not be necessary to deploy the door airbag. Individual control over deployment of each airbag can increase safety while reducing the cost of repair after an accident.

An alternative to central control module 50 individually controlling remote modules is to group remote modules together. Remote modules 55, 56, 57, and 58 are connected to a remote control module 59. Remote modules 55–58 are connected in a grouped function. A single control signal from central control module 50 controls remote modules 55–58. Remote control module 59 comprises minimal logic circuitry for providing control signals to each of the remote modules. The grouped function can simultaneously fire each airbag corresponding to a remote module or in a sequence.

By now it should be appreciated that an airbag system has been provided. The airbag system reduces electromagnetic radiation pick up by reducing wire length to a squib by incorporating a remote module in the airbag assembly. The remote module is formed as a female plug that simplifies assembly with the airbag system. Reducing electromagnetic radiation pick up allows the magnitude of the current required for a squib to ignite pyrotechnic material to be reduced. The remote module includes a power source (capacitor) and switches for forming a complete circuit path with a squib. The voltage to which the capacitor is charged is reduced to less than the battery voltage of the automobile. The capacitance value for the capacitor is also reduced which allows a high quality capacitor to be used. The use of a high quality capacitor increases long term reliability of the system.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. An automobile airbag system comprising:
   a control module; and
   at least one remote module responsive to said control module, said at least one remote module including a capacitor for providing energy to ignite a pyrotechnic material and further including an integrated circuit coupled to said capacitor and coupled for receiving a control signal from said control module;
   wherein the integrated circuit comprises:
      an address control logic circuit coupled to an input of said integrated circuit; and
      a firing delay circuit having an input coupled to an output of the address control logic circuit.

2. The automobile airbag system as recited in claim 1 further including a squib responsive to said at least one remote module, said squib being coupled to said pyrotechnic material.

3. The automobile airbag system as recited in claim 2 wherein said squib is formed from polysilicon.

4. The automobile airbag system as recited in claim 3 wherein said squib has a resistance greater than two ohms.

5. The automobile airbag system as recited in claim 2 further including:
   an airbag; and
   an airbag inflator assembly coupled to said airbag, said airbag inflator assembly including said pyrotechnic material and said squib.

6. The automobile airbag system as recited in claim 5 wherein wiring between said at least one remote module and said squib is less than or equal 3.0 centimeters to minimize electromagnetic radiation pick up.

7. The automobile airbag system as recited in claim 6 wherein said capacitor is selected from capacitor types comprising aluminum solid capacitors with organic semiconductive electrolyte, specialty polymer capacitors with solid electrolyte, tantalum capacitors, and aluminum electrolytic capacitors.

8. The automobile airbag system as recited in claim 7 wherein said integrated circuit further comprises a first terminal coupled to said capacitor, a first output coupled to a first terminal of said squib and a second output coupled to a second terminal of said squib.

9. The automobile airbag system as recited in claim 8 wherein said integrated circuit further comprises:
   a first transistor having a first electrode coupled to said capacitor, a control electrode responsive to said address control logic circuit, and a second electrode coupled to said first output of said integrated circuit; and
   a second transistor having a first electrode coupled to said second terminal of said squib, a control electrode responsive to said address control logic circuit, and a second electrode coupled to a power supply terminal wherein said first and second transistors form a conductive path when enabled for providing current from said capacitor through said squib for igniting said pyrotechnic material.

10. The automobile airbag system as recited in claim 9 wherein said firing delay circuit includes:
    a clock circuit;
    a firing duration circuit responsive to said clock circuit;
    a firing delay register responsive to said address control logic circuit for delaying an enable signal during an airbag deployment sequence;
    a firing circuit responsive to said firing duration circuit for enabling said first and second transistors; and
    wherein said integrated circuit further includes:
       a disarming circuit responsive to said firing duration circuit for discharging said capacitor.

11. The automobile airbag system as recited in claim 10 wherein said integrated circuit further includes:
    a charge pump circuit responsive to said firing circuit for enabling said first transistor; and
    a voltage regulator coupled to said first terminal of said integrated circuit for providing a reference voltage to power said address control logic circuit, said clock circuit, said firing duration circuit, said firing delay register, and said firing circuit.

12. The automobile airbag system as recited in claim 11 wherein said capacitor and said integrated circuit are placed in a plug assembly that couples to said squib.

13. A method for reducing current applied to a squib for igniting pyrotechnic material to inflate an airbag, the method comprising locating a capacitor and integrated circuit respectively for providing power and forming a conductive path through the squib within an airbag assembly to minimize electromagnetic pickup.

14. An automobile airbag system comprising:
    a control module;
    a plurality of airbag assemblies wherein each airbag assembly comprises:
       a plug assembly remote module responsive to said control module, said remote module including a capacitor for providing power;
       an airbag inflator assembly including a squib responsive to said remote module for igniting pyrotechnic material, said squib being powered by said capacitor; and
       an airbag for receiving gases released by said airbag inflator assembly.

15. The automobile airbag system as recited in claim 14 wherein each airbag assembly further includes an integrated circuit in said remote module, said integrated circuit being responsive to said control module for forming a conductive path from said capacitor through said squib to ground.

16. The automobile airbag system as recited in claim 15 wherein said integrated circuit comprises:
    an address control logic circuit responsive to said control module;
    a first transistor responsive to said address control logic circuit; and
    a second transistor responsive to said address control logic circuit wherein said first transistor couples said squib to said capacitor and said second transistor couples said squib to ground.

17. The automobile airbag system as recited in claim 16 wherein said integrated circuit further includes a delay circuit responsive to said address control logic circuit for delaying enablement of said first and second transistors of said remote module.

18. The automobile airbag system as recited in claim 17 wherein each plug assembly remote module couples to a corresponding squib.

19. The automobile airbag system as recited in claim 18 wherein wiring between said integrated circuit of each remote module and said corresponding squib is less than 3.0 centimeters in length.

20. The automobile airbag system as recited in claim 19 wherein said squib has a resistance greater than two ohms.

21. An integrated circuit comprising:
   an address control logic circuit coupled to an input of the integrated circuit;
   a first transistor responsive to said address control logic circuit; and
   a second transistor responsive to said address control logic circuit, wherein said first transistor is coupled to a first terminal and a first output of said integrated circuit and said second transistor is coupled to a second terminal and a second output of said integrated circuit.

22. The integrated circuit of claim 21 further comprising a delay circuit responsive to said address control logic circuit for delaying enablement of said first and second transistors.

23. The integrated circuit of claim 22, wherein the delay circuit comprises:
   a clock circuit;
   a firing duration circuit responsive to said clock circuit;
   a firing delay register responsive to said address control logic circuit for delaying an enable signal; and
   a firing circuit responsive to said firing duration circuit for enabling said first and second transistors.

24. The integrated circuit of claim 23, further comprising a disarming circuit responsive to said firing duration circuit.

25. The integrated circuit of claim 24 further comprising:
   a charge pump circuit responsive to said firing circuit for enabling said first transistor; and
   a voltage regulator coupled to said first terminal of said integrated circuit for providing a reference voltage to power said address control logic circuit, said clock circuit, said firing duration circuit, said firing delay register, and said firing circuit.

* * * * *